US007151576B2

(12) United States Patent
Coffin, III

(10) Patent No.: US 7,151,576 B2
(45) Date of Patent: *Dec. 19, 2006

(54) METHOD AND APPARATUS FOR MODULATING VIDEO SIGNALS

(75) Inventor: Louis F. Coffin, III, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 2 days.

This patent is subject to a terminal disclaimer.

(21) Appl. No.: 11/140,848

(22) Filed: May 31, 2005

(65) Prior Publication Data

US 2005/0219413 A1 Oct. 6, 2005

Related U.S. Application Data

(63) Continuation of application No. 10/185,951, filed on Jun. 27, 2002, now Pat. No. 6,956,622.

(51) Int. Cl.
*H04N 5/40* (2006.01)
*H04N 5/455* (2006.01)
*H04N 9/77* (2006.01)

(52) U.S. Cl. ............. 348/724; 348/727; 348/712; 348/713

(58) Field of Classification Search ........ 348/723–728, 348/663, 708, 638–642, 712, 713, 571, 519, 348/469, 518; 386/39, 44; *H04N 5/44, 5/40, H04N 5/455, 9/66, 9/77, 9/64*
See application file for complete search history.

(56) References Cited

U.S. PATENT DOCUMENTS

| RE33,535 E | 2/1991 | Cooper |
|---|---|---|
| 5,526,129 A | 6/1996 | Ko |
| 5,877,820 A | 3/1999 | Yamamuro et al. |

FOREIGN PATENT DOCUMENTS

GB 2112245 * 7/1983

OTHER PUBLICATIONS

Kamangar, et al; "Adaptive Coding Of NTSC Component Video Signals"; CH1539-6/80/0000-0181; 1980 IEEE; pp. 36.4.1-36.4.6.
Savon, Karl; "A TV modulator IC from National that produces a composite video modulated RF signal"; Radio-Electronics; vol. 49, No. 5; pp. 84-85; (May 1978).
Maegele, Manfred; "Digital Transmission of Two Television Sound Channels in Horizontal Blanking"; Journal of the SMPTE, vol. 84; Feb. 1975; pp. 68-70.
Kamangar, et al., "Adaptive Coding of NTSC Component Video Signals", CH1539-6/80/0000-0181, 1980 IEEE, pp. 36.4.1-36.4.6.
Maegele, "Digital Transmission of Two Television Sound Channels in Horizontal Blanking", Journal of the SMPTE, vol. 84, Feb. 1975, pp. 68-70.
Savon, "A TV Modulator IC from National that Produces a Composite Video Modulated RF Signal", Radio-Electronic, May 1978, vol. 49, No. 5, pp. 84-85.

* cited by examiner

*Primary Examiner*—Sherrie Hsia
(74) *Attorney, Agent, or Firm*—Lee & Haynes, PLLC

(57) ABSTRACT

A luminance component of a video signal is modulated in a first frequency band. A first chrominance component of the video signal is modulated in a second frequency band and is mixed with an audio component. A second chrominance component of the video signal is modulated in a third frequency band. The modulated luminance component, the first modulated chrominance component, and the second modulated chrominance component are then transmitted across a communication link.

13 Claims, 8 Drawing Sheets

METHOD AND APPARATUS FOR MODULATING VIDEO SIGNALS

This application is a continuation of and claims priority to U.S. patent application Ser. No. 10/185,951 entitled "Method and Apparatus for Modulating Video Signals" filed Jun. 27, 2002 now U.S. Pat. No. 6,956,622 to Coffin, the disclosure of which is incorporated by reference herein.

TECHNICAL FIELD

This invention relates to signal processing and, in particular, to systems and methods that modulate multiple video signal components for transmission across a communication link.

BACKGROUND

Various types of video signals are used to communicate video data between two devices. For example, composite video is a type of video signal in which all video data (e.g., the red signals, the blue signals, and the green signals) are mixed together and transmitted across a single communication link, such as a coaxial cable link. S-Video (Super-Video) signals separate the video data into two separate signals: one for color (chrominance) data, and the other for brightness (luminance) data. When sent to a television or other display device, the S-Video technology generally produces sharper images than composite video because the two signals are kept separate from one another such that the two signals do not interfere with each other. Another format, referred to as component video, separates the video data into three separate signals: the luminance signal, and two chrominance components (labeled $P_R$ and $P_B$). Thus, component video signals generally produce sharper images than either composite video or S-Video signals.

Although the S-Video and component video formats usually produce sharper images, the video formats cannot be transmitted, or otherwise distributed, over coaxial cable which is typically found in most building structures to distribute the video signals. Further, S-Video and component video cables of arbitrary length are not built into new structures because the video cable connectors are molded for a better connection and the cables cannot be easily routed through walls during construction, or retro-fitted after. Additionally, S-Video and component video cables do not carry audio which must be wired for separately. Thus, in an environment where high quality video signals are to be transmitted (such as in a home network environment), existing video transmission systems are not adequate.

Accordingly, there is a need for systems and methods that allow for the transmission of high quality video signals over long distances and over existing video cables in a network environment.

SUMMARY

The systems and methods described herein modulate various components of a video signal in different frequency bands such that the different video signal components are associated with different frequency bands. Since the video signal components are in different frequency bands, they are unlikely to interfere with one another, even when transmitted long distances using a common communication link.

In one embodiment, a luminance component of a video signal is modulated in a first frequency band. A chrominance component of the video signal is modulated in a second frequency band. The modulated luminance component of the video signal and the modulated chrominance component of the video signal are transmitted across a communication link.

In another embodiment, a luminance component of a video signal is modulated in a first frequency band. A first chrominance component of the video signal is modulated in a second frequency band. A second chrominance component of the video signal is modulated in a third frequency band. The modulated luminance component of the video signal, the first modulated chrominance component of the video signal, and the second modulated chrominance component of the video signal are transmitted across a communication link.

In a particular embodiment, a signal is received containing a modulated luminance component and a modulated chrominance component. The modulated luminance component and the modulated chrominance component are demodulated. A video signal is generated containing the luminance component and the chrominance component.

BRIEF DESCRIPTION OF THE DRAWINGS

The same numbers are used throughout the drawings to reference like features and components.

DETAILED DESCRIPTION

Figure 1:
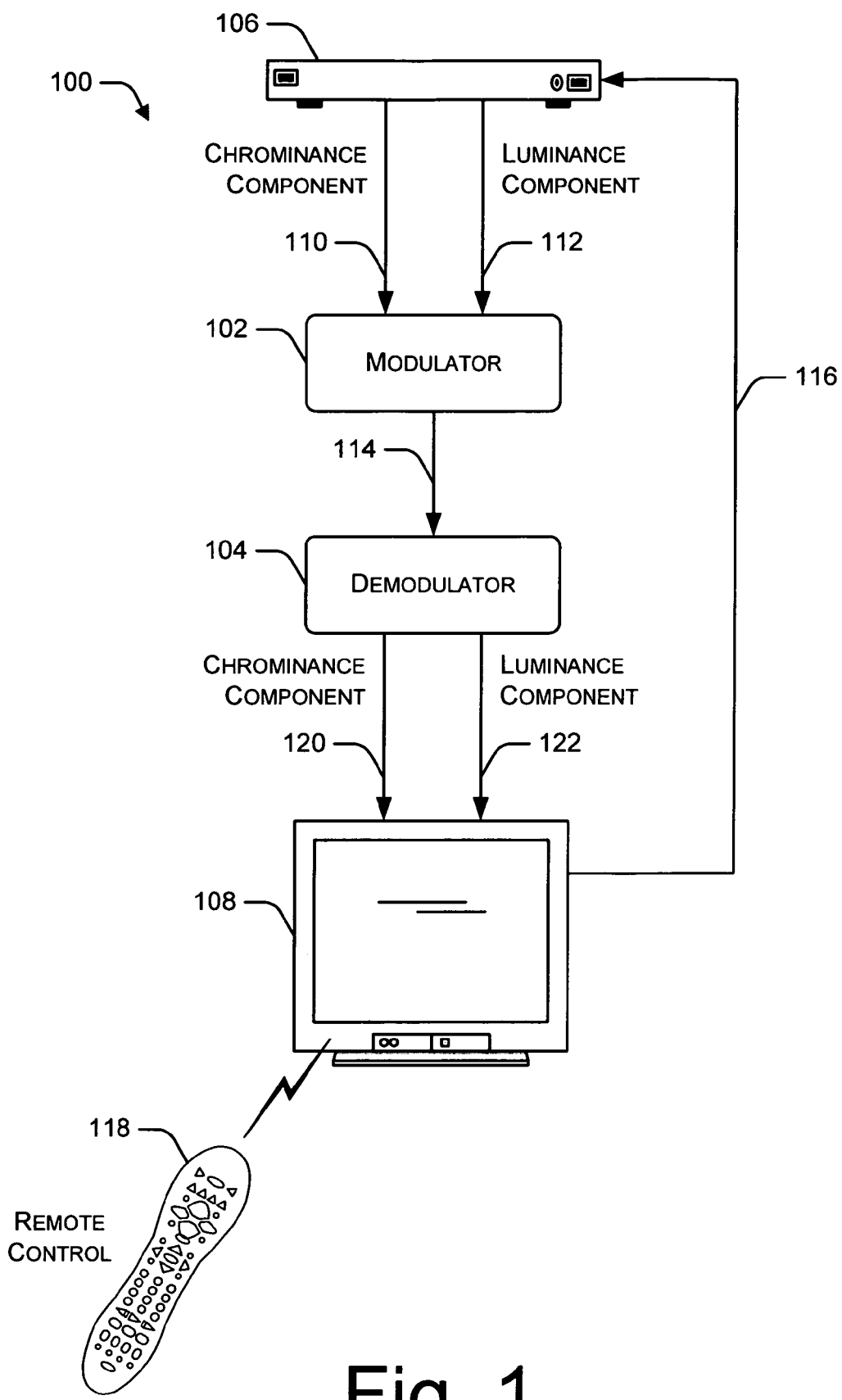
FIG. 1 illustrates an example environment in which a modulator and a demodulator process video signals communicated from a client device to a display device.

FIG. 1 illustrates an exemplary environment 100 in which the methods and systems for modulating video signals may be implemented. Exemplary environment 100 includes a modulator 102 and a demodulator 104 implemented to process video signals communicated from a client device 106 to a display device, such as television 108.

In a television-based entertainment and information system, for example, client device 106 receives television programs and on-demand movies from a content distribution system via a broadcast network which may include a cable television network, RF, microwave, satellite, and/or data network, such as the Internet, and may also include wired or wireless media using any broadcast format or broadcast protocol. Client device 106 can be implemented as a set-top box, a satellite receiver, a TV recorder with a hard disk, a digital video recorder (DVR) and playback system, a personal video recorder (PVR) and playback system, a game console, an information appliance, and as any number of similar embodiments. In an alternate system configuration, a client device 106 can be coupled to any number of televisions 108 and/or similar devices that can be implemented to display or otherwise render content. Similarly, any number of client devices 106 can be coupled to a single television 108.

In exemplary environment 100, client device 106 communicates video signals to television 108 by generating an S-Video output signal representing a series of video images. The S-Video output signal contains two separate video components, one component for color (a chrominance component 110) and another component for brightness (a luminance component 112). The chrominance component 110 and the luminance component 112 are communicated to modulator 102 which modulates the two components into different frequency bands such that the two modulated components can be communicated across a single communication link 114 without interfering with one another. Communication link 114 may be a wired or a wireless communication link using any type of communication medium.

Another communication link 116 represents a radio-frequency (RF) communication link between the client device 106 and television 108 to communicate such information as remote control selection inputs received as viewer commands from a viewer-operated remote control device 118. Remote control selection inputs include volume control commands and channel change selections that are communicated to client device 106 via television 108, such as when the client device is located in a separate room from the television.

The demodulator 104 demodulates the two components of the video signal to their original values; i.e., a chrominance component 120 and a luminance component 122. The chrominance component 120 and the luminance component 122 are communicated to television 108 to display the associated video images. Additional details regarding modulator 102 and demodulator 104 are provided below. The configuration of components illustrated in FIG. 1 is particularly useful when client device 106 is located a distance from television 108 that would require an S-Video cable longer than approximately six feet. In a particular embodiment, client device 106 may be located in a different room or area than television 108. Further, the two components 120 and 122 of the video signal can be communicated to television 108 over conventional coaxial cable without a degradation of image quality.

Although FIG. 1 illustrates modulator 102 as a separate component, the modulator may be integrated into client device 106. Similarly, FIG. 1 illustrates demodulator 104 as a separate component. However, demodulator 104 can be integrated into television 108, a video recording device, or other device.

Figure 2:
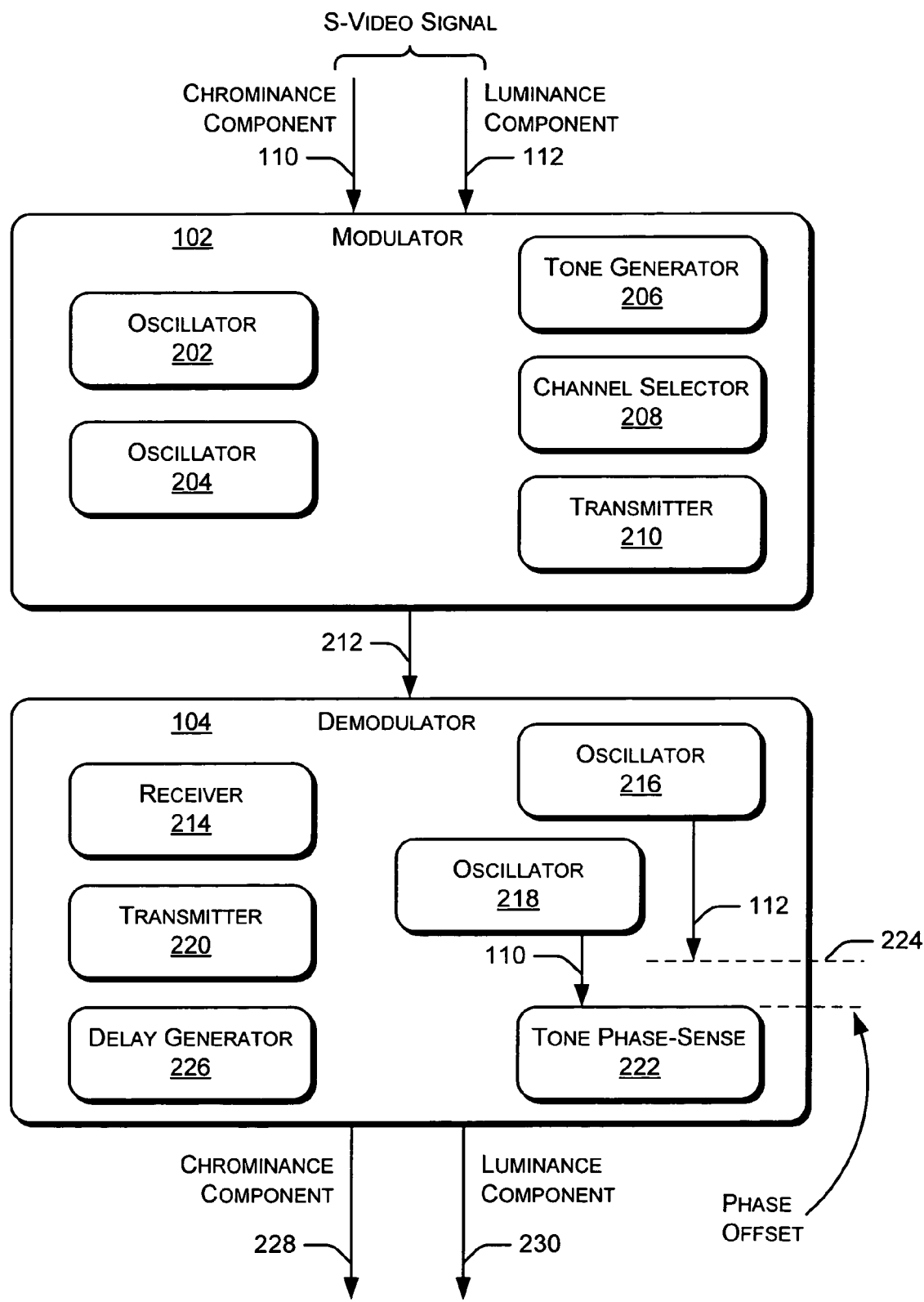
FIG. 2 is a block diagram that illustrates components of an example modulator and an example demodulator.

FIG. 2 is a block diagram that illustrates components of an example modulator and an example demodulator. The modulator 102 receives an S-Video signal from a client device or other source (not shown). The S-Video signal includes the chrominance component 110 and the luminance component 112. Modulator 102 includes two oscillators 202 and 204, and a tone generator 206. The two oscillators 202 and 204 are used to modulate the two S-Video components 110 and 112 into two different frequency bands. Each frequency band may also be referred to as a "channel". The tone generator 206 can be used to determine a phase offset between the video signal components that may be incurred during signal processing.

A common single tone can be modulated as a component of both the chrominance component 110 and the luminance component 112. When the combined single tone and component signals are de-modulated, the tone is recovered for both. A variable delay circuit can be implemented to select varying delays to align the phase of the tone as closely as possible. Alternatively, the single tone can be generated when power is applied to the circuit to create a calibration cycle that precludes having to combine the tone and the content together.

Modulator 102 also includes a channel selector 208 that works in combination with the two oscillators 202 and 204 to identify channels or frequency bands that are available for transmitting the two S-Video components 110 and 112. A transmitter 210 in modulator 102 transmits the two modulated S-Video components across a single communication link 212 to the demodulator 104.

The demodulator 104 includes a receiver 214, two oscillators 216 and 218, and a transmitter 220. The receiver 214 receives the modulated S-Video components from the modulator 102 via communication link 212. The two oscillators 216 and 218 are used to demodulate the S-Video components from the received signal.

Demodulator 104 also includes a tone phase-sense 222 to determine any phase offsets 224 between the chrominance component 110 and the luminance component 112 incurred during signal processing. A delay generator 226 in demodulator 104 delays one of the two modulated S-Video components 110 or 112 if needed to properly align the two S-Video components. The delay introduced by delay generator 226 is calculated based on the time for each of the signals generated by tone generator 206 to propagate between the modulator 102 and the demodulator 104. Transmitter 220 then outputs a chrominance component 228 and a luminance component 230 when the S-Video components are demodulated.

Figure 3:
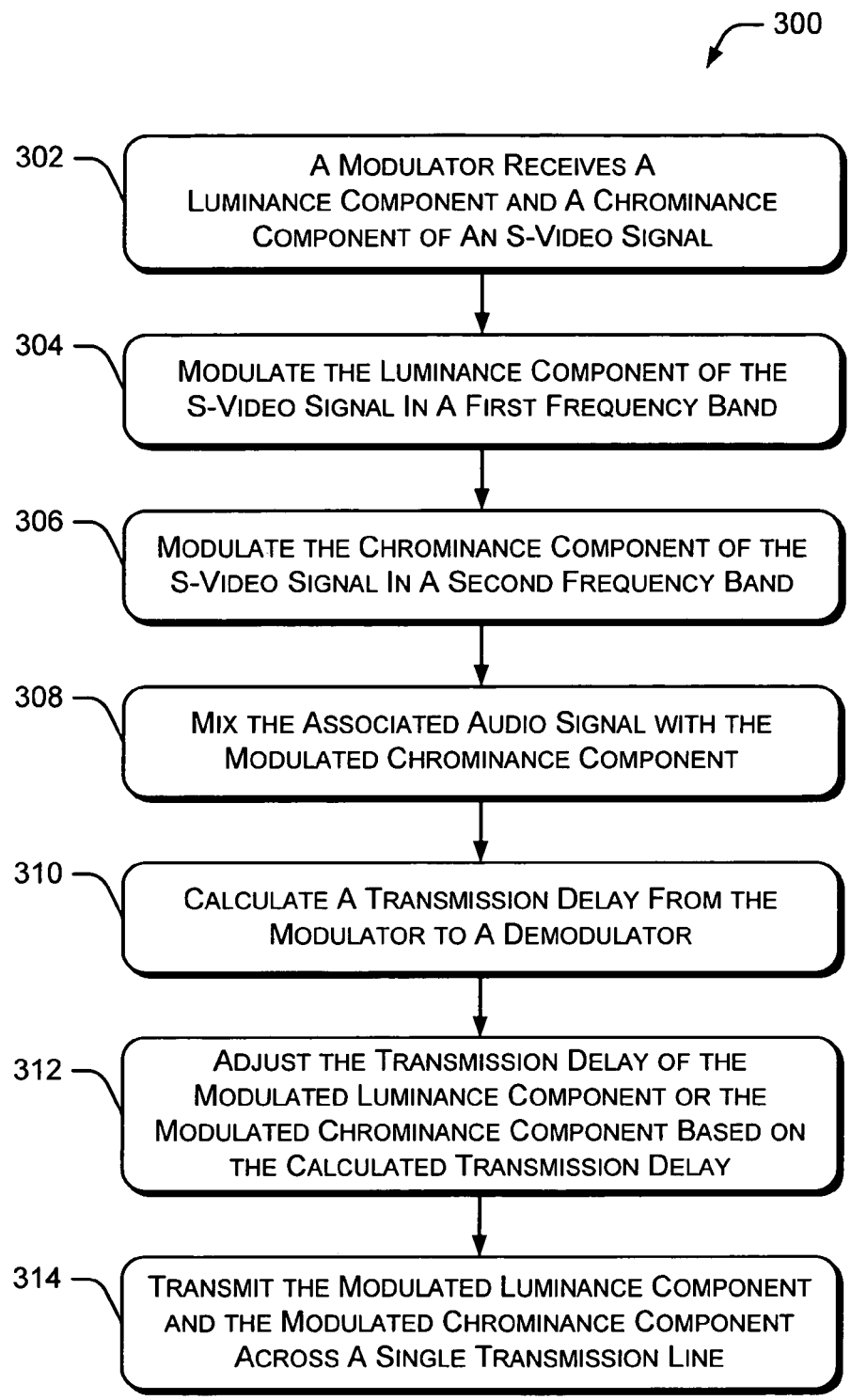
FIG. 3 illustrates a flow diagram of a procedure for modulating an S-Video signal.

FIG. 3 illustrates a flow diagram of a procedure 300 for modulating an S-Video signal. Initially, a modulator receives a luminance component and a chrominance component of an S-Video signal (block 302). The luminance component of the S-Video signal is modulated in a first frequency band (block 304). The chrominance component of the S-Video signal is modulated in a second frequency band (block 306). The first and second frequency bands are different from one another such that the two modulated components do not interfere with one another.

An audio signal (also referred to as an audio portion of the video signal) is typically communicated along with a video signal. In one implementation, the audio signal is mixed or combined with the modulated chrominance component (block 308). The audio signal is combined with the modulated chrominance component because the chrominance component has a smaller bandwidth and has a frequency that is considerably different than the frequency of the audio signal. Thus, there is a small likelihood of any significant distortion of the audio signal by the chrominance component or vice versa.

Next, the procedure 300 calculates a transmission delay from the modulator to the demodulator (block 310). The procedure then adjusts the transmission delay of the modulated luminance component or the modulated chrominance component based on the calculated transmission delay (block 312). This adjustment maintains proper alignment of the chrominance and luminance data. Finally, the modulated luminance component and the modulated chrominance component is transmitted across a single transmission line or a single communication link (block 314).

Figure 4:
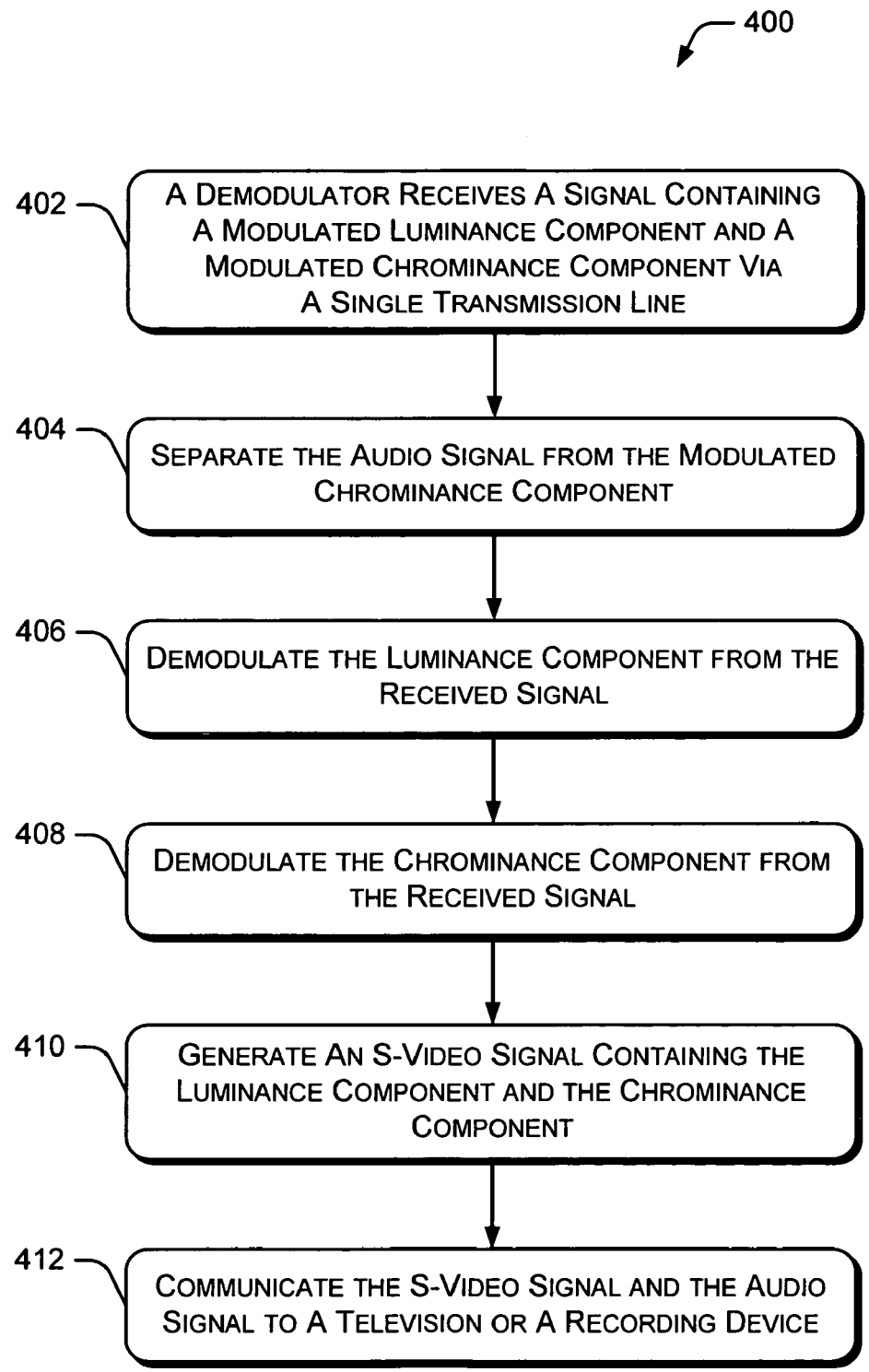
FIG. 4 illustrates a flow diagram of a procedure for demodulating a received signal into an S-Video signal.

FIG. 4 illustrates a flow diagram of a procedure 400 for demodulating a received signal into an S-Video signal.

Initially, a demodulator receives a signal containing a modulated luminance component and a modulated chrominance component via a single transmission line or a single communication link (block 402). The procedure 400 then separates the audio signal from the modulated chrominance component (block 404). The luminance component is then demodulated from the received signal (block 406) and the chrominance component is demodulated from the received signal (block 408). An S-Video signal is then generated which contains the luminance component and the chrominance component demodulated from the received signal (block 410). The S-Video signal and the audio signal are then communicated to, for example, a television or a recording device (block 412).

In a particular implementation of the modulator/demodulator system discussed above, the luminance component is a 0–6 Megahertz (MHz) single side band signal which is multiplied by a 30 MHz sine wave, resulting in a 24–36 MHz double side band signal. Since this resulting signal is radio frequency (RF), it can be efficiently transmitted on a single transmission line, such as a coaxial cable. Amplitude modulation or frequency modulation may be used to modulate the luminance component and the chrominance component of the S-Video signal.

Figure 5:
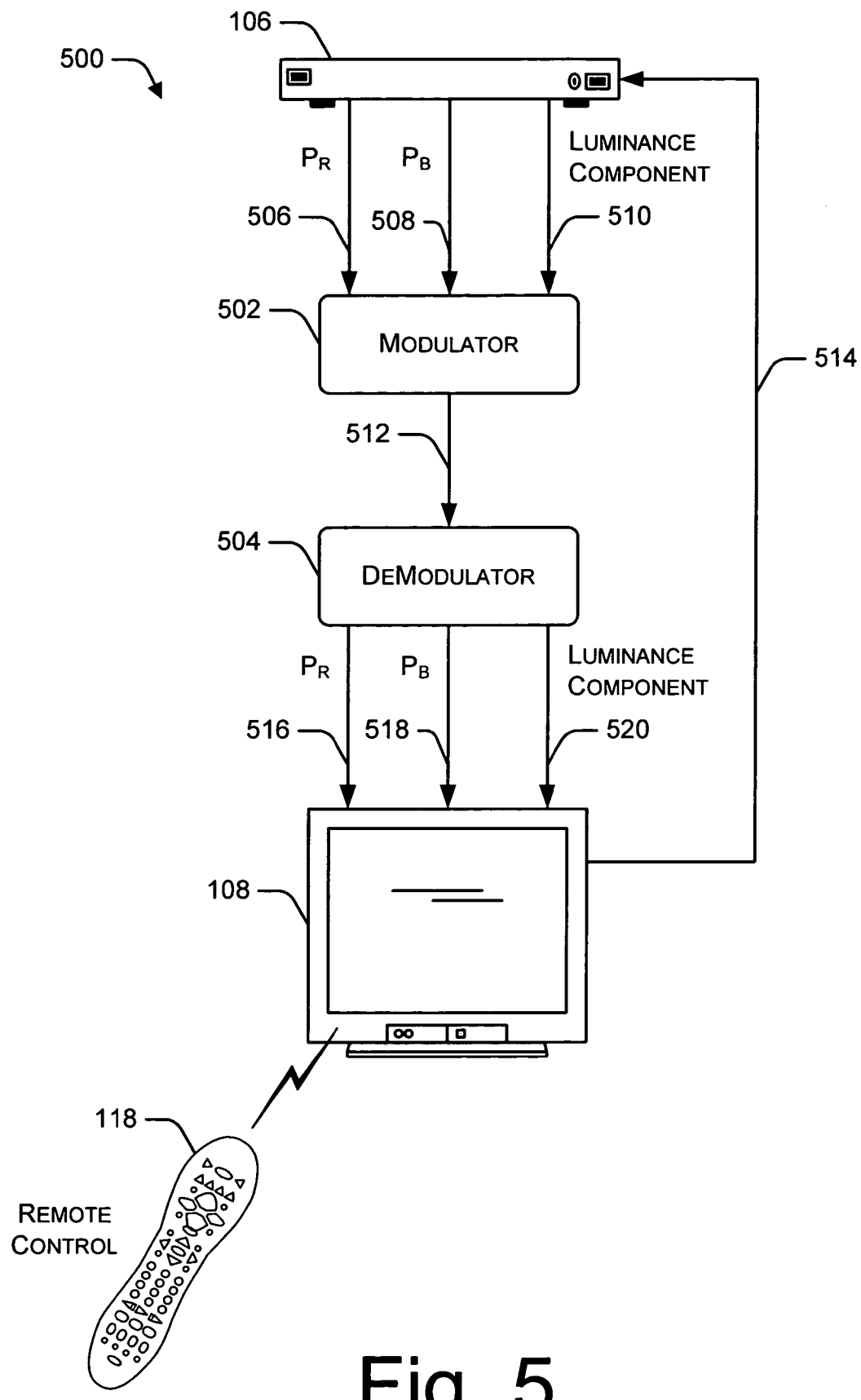
FIG. 5 illustrates an example environment in which a modulator and a demodulator process component video signals communicated from a client device to a display device.
Figure 6:
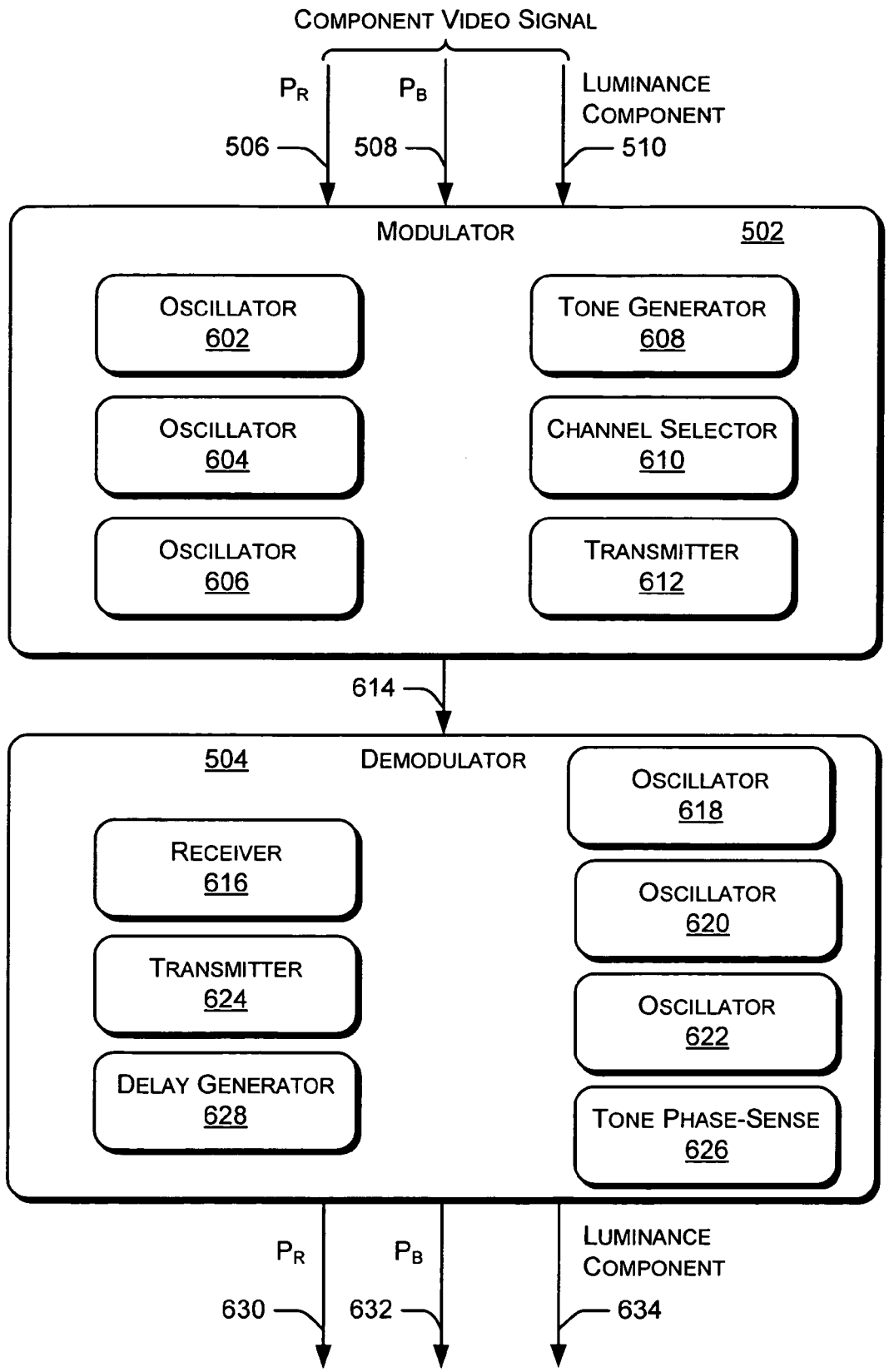
FIG. 6 is a block diagram that illustrates components of an example modulator and an example demodulator.

FIG. 5 illustrates an example environment 500 in which a modulator 502 and a demodulator 504 are implemented to process component video signals communicated from client device 106 to television 108. The environment of FIG. 6 is similar to the environment illustrated in FIG. 1 and discussed above, but processes component video signals instead of S-Video signals.

In example environment 500, client device 106 communicates video signals to television 108 by generating a component video output signal representing a series of video images. The component video output signal contains three separate video components, two components for color ($P_R$ 506 and $P_B$ 508) and another component for brightness (a luminance component 510). The three components are communicated to modulator 502 which modulates the three components into different frequency bands such that the three modulated components can be communicated across a single communication link 512 without interfering with one another. Communication link 512 may be a wired or a wireless communication link using any type of communication medium. Another communication link 514 represents a radio-frequency (RF) communication link between the client device 106 and television 108 to communicate such information as remote control selection inputs received as viewer commands from the viewer-operated remote control device 118.

The demodulator 504 demodulates the three components to their original values; i.e., chrominance components $P_R$ 516 and $P_B$ 518 and a luminance component 520. The three components are communicated to television 108 to display the associated video images. The configuration of components illustrated in FIG. 5 is particularly useful when client device 106 is located a distance from television 108 that would require a relatively long component video cable. In a particular embodiment, client device 106 may be located in a different room or area than television 108. Further, the three components 516, 518, and 520 of the video signal can be communicated to television 108 over conventional coaxial cable without a degradation of image quality.

Although FIG. 5 illustrates modulator 502 as a separate component, the modulator may be integrated into client device 106. Similarly, FIG. 5 illustrates demodulator 504 as a separate component. However, demodulator 504 can be integrated into television 108, a video recording device, or other device. Additionally, modulator 502 and modulator 102 (FIG. 1) may be combined into a single device. Further, demodulator 504 and demodulator 104 (FIG. 1) may be combined into a single device.

FIG. 6 is a block diagram that illustrates components of an example modulator and an example demodulator. The components shown in FIG. 6 are similar to those illustrated in FIG. 2 and discussed above, but process component video signals instead of S-Video signals. The modulator 502 receives a component video signal from a client device or other source (not shown). The component video signal includes the chrominance components $P_R$ 506 and $P_B$ 508, and the luminance component 510. Modulator 502 includes three oscillators 602, 604, and 606, as well as a tone generator 608. The three oscillators 602, 604, and 606 are used to modulate the three component video components 506, 508, and 510, respectively, into three different frequency bands. Each frequency band may also be referred to as a "channel". The tone generator can be used to determine a phase offset between the video signal components that may be incurred during signal processing.

Modulator 502 also includes a channel selector 610 that works in combination with the three oscillators 602, 604, and 606 to identify channels or frequency bands that are available for transmitting the three component video components 506, 508, and 510. A transmitter 612 in modulator 502 transmits the three modulated component video components across a single communication link 614 to the demodulator 504.

The demodulator 504 includes a receiver 616, three oscillators 618, 620, and 622, and a transmitter 624. The receiver 616 receives the modulated component video components from the modulator 502 via communication link 614. The three oscillators 618, 620, and 622 are used to demodulate the component video components from the received signal.

Demodulator 504 also includes a tone phase-sense 626 to determine any phase offsets between the video components 506, 508, and 510 incurred during signal processing. A delay generator 628 in demodulator 504 delays one or more of the three modulated component video components 506, 508, and 510 if needed to properly align the three component video components. The delay introduced by delay generator 628 is calculated based on the time for each of the signals generated by tone generator 608 to propagate between the modulator 502 and the demodulator 504. Transmitter 624 then outputs two chrominance components $P_R$ 630 and $P_B$ 632, and a luminance component 634.

Figure 7:
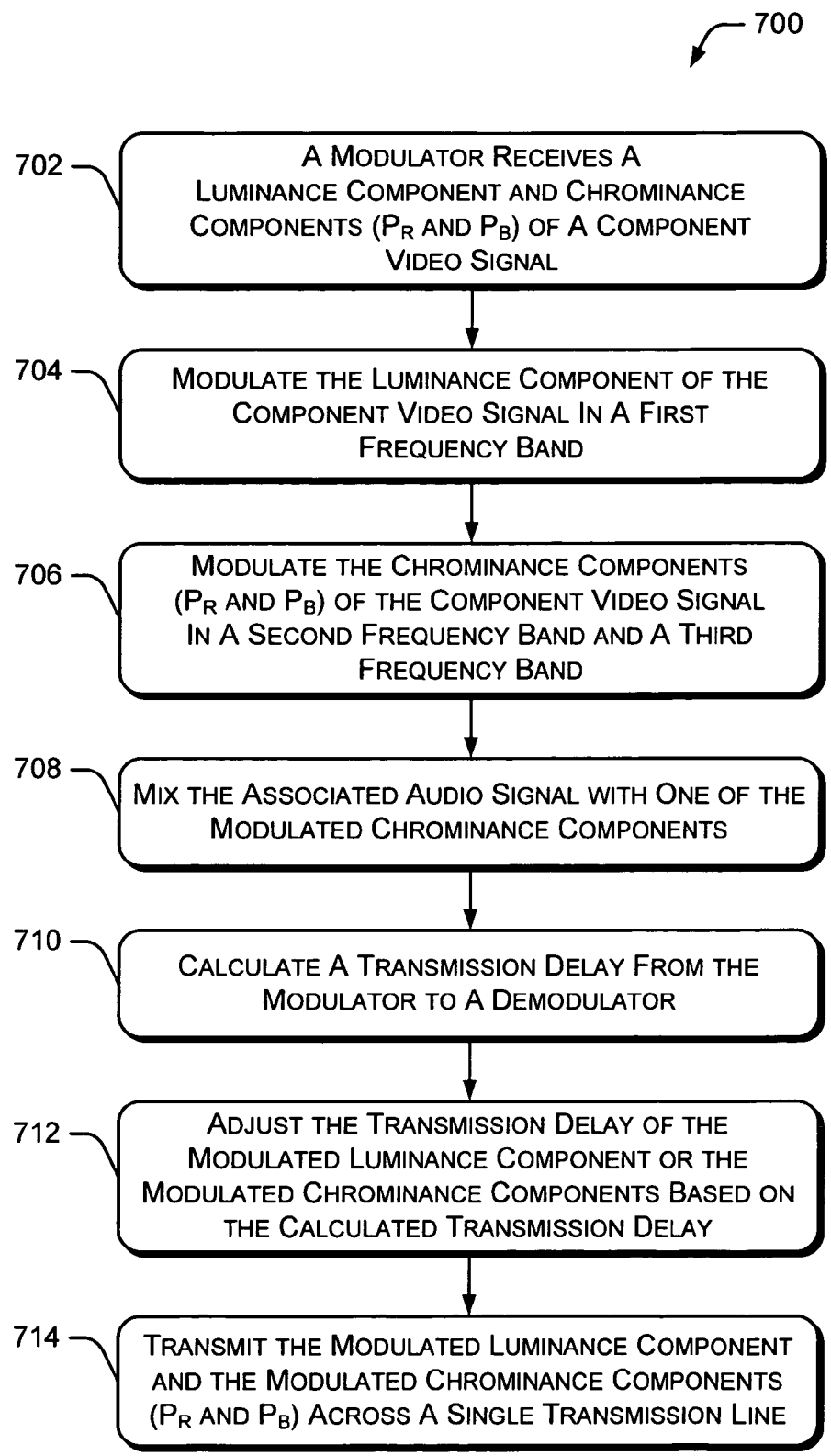
FIG. 7 illustrates a flow diagram of a procedure for modulating a component video signal.

FIG. 7 illustrates a flow diagram of a procedure 700 for modulating a component video signal. Initially, a modulator receives a luminance component and two chrominance components ($P_R$ and $P_B$) of a component video signal (block 702). The procedure then modulates the luminance component of the component video signal in a first frequency band (block 704). The chrominance components ($P_R$ and $P_B$) of the component video signal are modulated in a second frequency band and a third frequency band (block 706). An associated audio signal is then mixed or combined with one of the modulated chrominance components (block 708). The procedure then calculates a transmission delay from the modulator to a demodulator (block 710). The transmission delay of the modulated luminance component or the modulated chrominance components is adjusted, if necessary, based on the calculated transmission delay (block 712). The modulated luminance component and the modulated chrominance components ($P_R$ and $P_B$) are then transmitted across a single transmission line or communication link (block 714).

Figure 8:
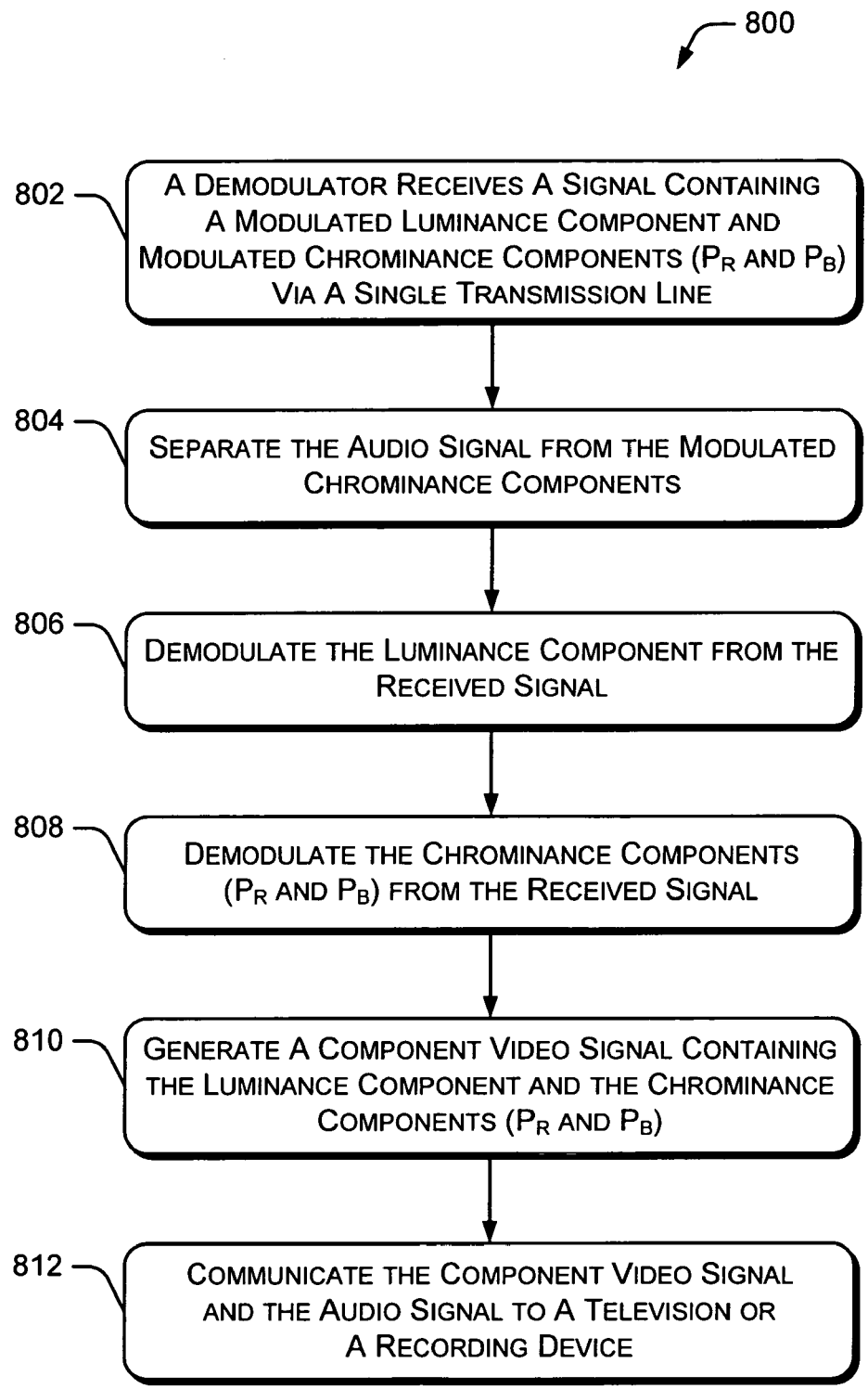
FIG. 8 illustrates a flow diagram of a procedure for demodulating a received signal into a component video signal.

FIG. 8 illustrates a flow diagram of a procedure 800 for demodulating a received signal into a component video signal. Initially, a demodulator receives a signal containing a modulated luminance component and modulated chrominance components ($P_R$ and $P_B$) via a single transmission line or communication link (block 802). The audio signal is separated from the modulated chrominance components (block 804). The procedure then demodulates the luminance component from the received signal (block 806) and demodulates the chrominance components ($P_R$ and $P_B$) from the received signal (block 808). At block 810, procedure 800 generates a component video signal that contains the luminance component and the chrominance components ($P_R$ and $P_B$). Finally, the component video signal and the audio signal are communicated to, for example, a television or a recording device (block 812).

Although the invention has been described in language specific to structural features and/or methods, it is to be understood that the invention defined in the appended claims is not necessarily limited to the specific features or methods described. Rather, the specific features and methods are disclosed as preferred forms of implementing the claimed invention.

The invention claimed is:

1. An apparatus comprising:
   means for modulating a luminance component of a video signal in a first frequency band;
   means for modulating a first chrominance component of the video signal in a second frequency band;
   means for modulating a second chrominance component of the video signal in a third frequency band;
   means for transmitting the modulated luminance component of the video signal, the first modulated chrominance component of the video signal, and the second modulated chrominance component of the video signal across a communication link; and
   means for combining an audio signal with the first modulated chrominance component of the video signal.

2. An apparatus as recited in claim 1 wherein the video signal is a component video signal.

3. An apparatus as recited in claim 1 wherein the communication link is a single transmission line.

4. An apparatus as recited in claim 1 wherein the communication link is a wireless communication link.

5. An apparatus as recited in claim 1 further comprising means for determining a transmission delay to a demodulator.

6. One or more computer-readable media comprising computer executable instructions that, when executed, direct an apparatus to:
   modulate a luminance component of a video signal in a first frequency band;
   modulate a first chrominance component of the video signal in a second frequency band;
   modulate a second chrominance component of the video signal in a third frequency band;
   transmit the modulated luminance component of the video signal, the first modulated chrominance component of the video signal, and the second modulated chrominance component of the video signal across a communication link; and
   combine an audio signal with the first modulated chrominance component of the video signal.

7. One or more computer-readable media as recited in claim 6 wherein the video signal is a component video signal.

8. One or more computer-readable media as recited in claim 6 wherein the communication link is a single transmission line.

9. One or more computer-readable media as recited in claim 6 wherein the communication link is a wireless communication link.

10. One or more computer-readable media as recited in claim 6 further comprising computer executable instructions that, when executed, direct the apparatus to determine a transmission delay to a demodulator.

11. One or more computer-readable media comprising computer executable instructions that, when executed, direct an apparatus to:
    receive a signal containing a modulated luminance component, a first modulated chrominance component, and a second modulated chrominance component;
    demodulate the modulated luminance component;
    demodulate the first modulated chrominance component;
    demodulate the second modulated chrominance component; and
    generate a video signal containing the luminance component, the first chrominance component, and the second chrominance component; and
    separate an audio signal from the first modulated chrominance component.

12. One or more computer-readable media as recited in claim 11 wherein the video signal is a component video signal.

13. One or more computer-readable media as recited in claim 11 further comprising further comprising computer executable instructions that, when executed, direct the apparatus to communicate the video signal to a display device.

* * * * *